US010127950B1

(12) United States Patent
Zhang et al.

(10) Patent No.: US 10,127,950 B1
(45) Date of Patent: Nov. 13, 2018

(54) DATA STORAGE DEVICE WITH MOVING AMBIENT TEMPERATURE SENSOR

(71) Applicant: Seagate Technology LLC, Cupertino, CA (US)

(72) Inventors: Lihong Zhang, Singapore (SG); Samuel Gan, Singapore (SG); Xiong Liu, Singapore (SG); Tanghe Guo, Singapore (SG); Takashi Fujita, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/590,367

(22) Filed: May 9, 2017

(51) Int. Cl.
*G11B 33/14* (2006.01)
*G11B 5/40* (2006.01)
*G11B 5/012* (2006.01)
*G11B 5/105* (2006.01)

(52) U.S. Cl.
CPC .............. *G11B 33/144* (2013.01); *G11B 5/40* (2013.01); *G11B 5/012* (2013.01); *G11B 5/105* (2013.01)

(58) Field of Classification Search
None
See application file for complete search history.

(56) References Cited

U.S. PATENT DOCUMENTS 6,088,662 A 7/2000 Flinsbaugh et al.
6,956,707 B2 * 10/2005 Ottesen .................. G11B 5/012 360/25
7,369,348 B2 * 5/2008 Strom .................. G11B 5/6005 360/75
7,518,818 B2 * 4/2009 Yamazaki ............ G11B 5/6005 360/69
7,620,519 B2 * 11/2009 Yoon .................... G11B 19/046 324/73.1
7,796,356 B1 * 9/2010 Fowler ................. G11B 5/3133 360/25
7,800,858 B1 * 9/2010 Bajikar ................ G11B 5/3133 360/25
8,098,450 B2 * 1/2012 Baumgart ............ G11B 5/6005 360/25
8,599,506 B2 * 12/2013 Contreras ............ G11B 5/6011 360/31
8,705,323 B2 4/2014 Contreras et al.
8,711,508 B2 * 4/2014 Kurita .................. G11B 5/6076 360/55
8,873,191 B2 10/2014 Li et al.
(Continued)

FOREIGN PATENT DOCUMENTS

JP 2014179159 A * 9/2014 ............. G11B 5/607
JP 5967724 B2 * 8/2016 ............. G11B 5/607
KR 20020010491 A * 2/2002 ........... G11B 5/6005

*Primary Examiner* — William J Klimowicz
(74) *Attorney, Agent, or Firm* — Hall Estill Attorneys at Law

(57) ABSTRACT

A data storage device may be configured with a transducing head separated from a data storage medium by an air bearing. The transducing head and data storage medium are each contained within a housing. The transducing head can consist of a variable resistance sensor that is connected to a temperature module positioned within the housing. One or more operational variables can be measured by the variable resistance sensor to allow an ambient temperature within the housing to be calculated based on a measured operational variable.

20 Claims, 4 Drawing Sheets

130 158 134 158 132 136 106 160 160 160 108 110 160 116 160 160 108 168 114 158 134 104 Z Y X Z Y X
150 110 164 118 120 122 TEMP. MODULE 106 CONTROLLER 106 ABS 162 166 152 160 156 154 158

(56) References Cited

U.S. PATENT DOCUMENTS

| | | | | |
|---|---|---|---|---|
| 8,929,008 | B1 * | 1/2015 | O'Dell | G11B 20/1816 360/135 |
| 8,982,504 | B1 | 3/2015 | Contreras et al. | |
| 9,230,594 | B2 | 1/2016 | Kunkel et al. | |
| 9,454,986 | B2 * | 9/2016 | Johnson | G11B 13/08 |
| 9,721,603 | B2 * | 8/2017 | Olson | G11B 5/6011 |
| 9,824,705 | B1 * | 11/2017 | Macken | G11B 5/4853 |
| 2007/0268614 | A1 * | 11/2007 | Henry | G11B 5/40 360/75 |
| 2008/0204923 | A1 * | 8/2008 | Yoon | G11B 5/6005 360/75 |
| 2009/0141400 | A1 * | 6/2009 | Tanabe | G11B 5/581 360/234 |
| 2011/0157740 | A1 * | 6/2011 | Baumgart | G11B 5/6005 360/75 |
| 2012/0120522 | A1 * | 5/2012 | Johnson | G11B 5/607 360/75 |
| 2014/0269838 | A1 * | 9/2014 | Macken | G11B 5/607 374/183 |
| 2017/0125067 | A1 * | 5/2017 | Morimoto | G11B 33/1486 |

* cited by examiner

DATA STORAGE DEVICE WITH MOVING AMBIENT TEMPERATURE SENSOR

SUMMARY

A data storage device, in accordance with some embodiments, has a transducing head separated from a data storage medium by an air bearing. The transducing head and data storage medium are each contained within a housing. The transducing head consists of a variable resistance sensor that is connected to a temperature module positioned within the housing. One or more operational variables are measured by the variable resistance sensor to allow an ambient temperature within the housing to be calculated based on a measured operational variable.

DETAILED DESCRIPTION

Continued industry and consumer emphasis in greater data storage capacity and faster data access speed has reduced physical and operational tolerances. In addition, data storage systems commonly demand the accurate measurement of a diverse variety of operational conditions. The combination of reduced tolerances and more precise detection of operational parameters pose difficulties in sophisticated data storage systems.

Traditionally, the ambient temperature within a data storage device was measured by a physically static thermistor that has limited capabilities to accurately read the ambient temperature proximal the data storage components that respectively rotate and actuate to conduct data storage operations, such as in a hard disk drive (HDD). Hence, various embodiments are generally directed to a data storage system where the ambient temperature of a data storage device is measured with a sensor that moves along with an actuating suspension. The ability to measure ambient temperature in a data storage device with a sensor positioned on an actuating suspension reduces cost and heightens precision of temperature measurement.

Figure 1:
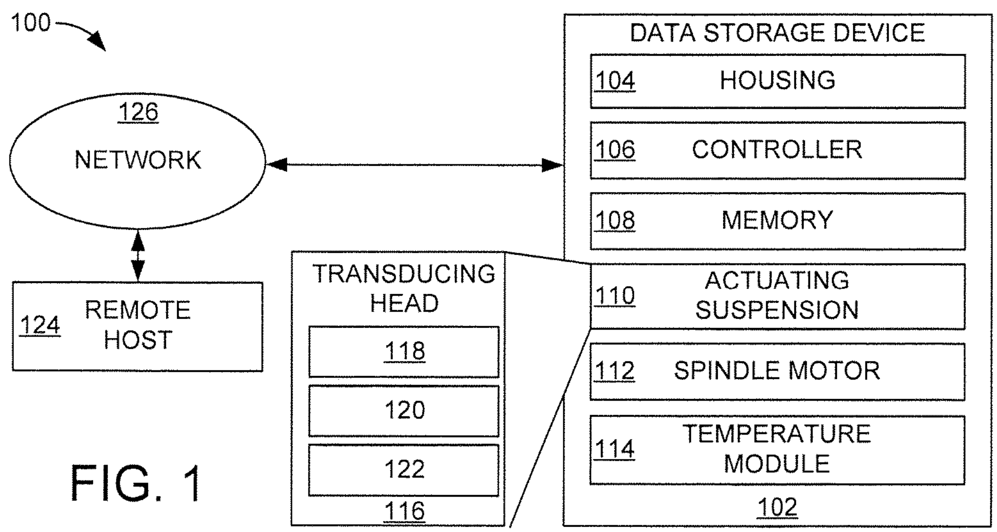
FIG. 1 is a block representation of an example data storage system in which various embodiments are practiced.

FIG. 1 represents an example data storage system 100 where assorted embodiments can be practiced. The data storage system 100 can consist of any number and type of data storage devices 102 that serve as temporary and/or permanent repository for data. As a non-limiting example, the data storage system 100 may connect one or more solid-state data storage devices with at least one HDD to form a storage array, such as a redundant array of independent devices (RAID).

Although not required, the HDD data storage device 102 can be arranged with a single housing 104 that physically contains data storage components. For instance, a local controller 106, such as a microprocessor or programmable controller, can be positioned within the housing 104 and electrically connected to at least a local memory 108, actuating suspension 110, spindle motor 112, and temperature module 114. It is contemplated that the local controller 106 is further connected to a transducing head 116 portion of the actuating suspension 110 where at least data reader 118, data writer 120, and variable resistance sensor 122 are positioned to conduct data access operations on an adjacent data storage medium.

The various components and capabilities of the data storage device 102 can be utilized by one or more remote hosts 124 via a wired, or wireless, network 126 concurrently and/or individually. The utilization of the temperature module 114 and variable resistance sensor 122 by the local controller 106 can allow for the intelligent measuring of ambient temperature within the housing 104 without having a physically static temperature sensor occupying valuable real estate within the housing 104 and increasing data storage device 102 costs.

Figure 2:
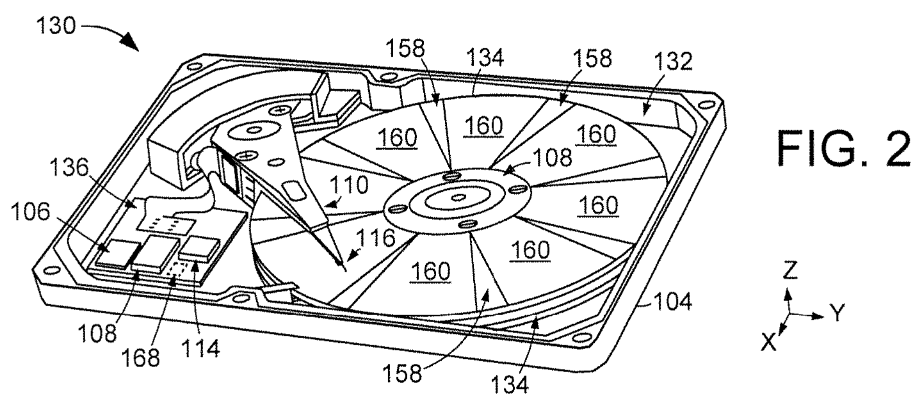
FIG. 2 represents an example data storage device that can be utilized in the data storage system of FIG. 1 in accordance with some embodiments.

FIG. 2 displays a line representation of a portion of an example data storage device 130 that may be utilized by the data storage system 100 of FIG. 1. The data storage device 130 is an HDD with a housing 104 defining an interior cavity 132 where multiple magnetic data storage media 134 are vertically stacked and mounted on a spindle 112. The interior cavity 132 is also occupied by actuating suspensions 110 that position a transducing head 116 in operating adjacently with the respective data storage surfaces of each data storage media 134 mounted on the spindle 112.

One or more circuit boards 136 can support the local controller 106 as well as the temperature module 114 and any temporary or permanent memory 108. The physical position and orientation of the assorted components in the housing cavity 132 can result in restricting airflow to areas proximal the rotating data storage media 134. The presence of moving air proximal the media 134 and relatively static air proximal the circuit board(s) 136 can result in a wide range of temperatures in the housing 104 during operation.

Accordingly, a physically static temperature sensor located on a circuit board 136 would not accurately be able to detect the ambient temperature of the airflow proximal the data storage components conducting data access operations. That is, a stationary temperature sensor located away from the media 134 and actuating suspension 110 cannot precisely measure the ambient temperature around the transducing head at the end of the actuating suspension 110 or on the data storage surface of the respective data storage media 134.

It is noted that that the ambient temperature within the cavity 132 is meant as the temperature of air proximal data storage media 134. Accurate measurement of the ambient temperature proximal the data storage media 134 allows the performance of the data storage device to be detected as well as prevention of temperature spikes that can degrade the structure and operation of the data storage device 130. With the ambient temperature, the local device controller 106 can continuously or sporadically monitor data storage operation and optimize device performance in a variety of different storage conditions.

Figure 3:
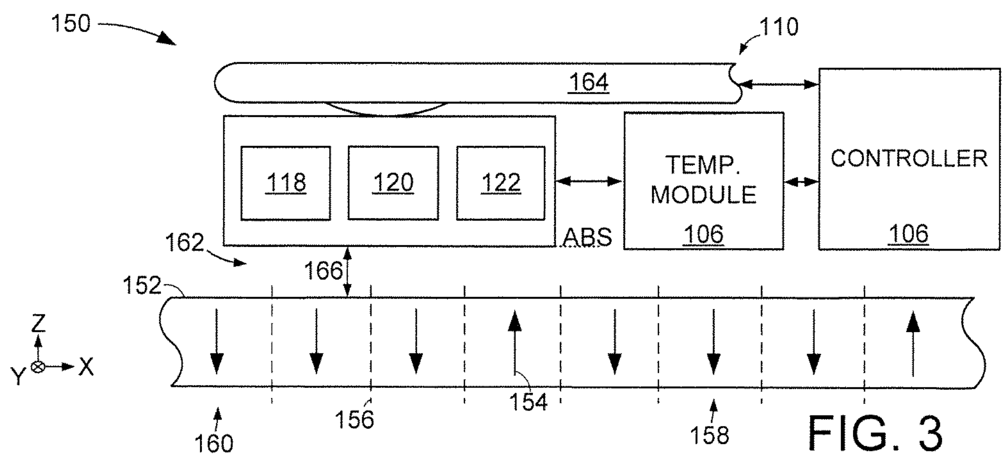
FIG. 3 shows a portion of an example data storage device that may be used in the data storage system of FIG. 1.

FIG. 3 illustrates a portion of an example data storage device 150 that may be employed in the data storage system 100 of FIG. 1. The cross-sectional representation of FIG. 3 conveys how the data storage medium 152 has at least one magnetic recording layer configured to store data 154 as magnetic polarities. The data 154 can be arranged in any manner on the medium 152, but in some embodiments, are aligned in concentric data tracks 156 corresponding to different radial positions relative to the centric spindle 112.

It is contemplated that the data 154 can be user generated or system generated. For example, non-user generated data associated with device function, such as runout correction and track gates, can be arranged in servo wedges 158, as shown in FIG. 2, while user generated data created, or modified, after the device 150 has been shipped, installed, and used by an end-user can reside in user data regions 160, as shown in FIG. 2. The system data, and corresponding physical block addresses, are positioned in the servo wedges 158 and are not accessible by an end-user. In contrast, the user data regions 160 are visible and accessible to the end-user to write data via the writer 120 of the transducing head 116 or read data via the reader 118 of the transducing head 116.

The transducing head 116 floats on an air bearing 162 above the data storage medium 152 and is supported by an actuating arm 164 of the actuating suspension 110 to allow the reader 118 and writer 120 to efficiently access the user data 154. The variable resistance sensor 122 in the transducing head 116 can detect the size 166 of the air bearing 162 as well as the presence of thermal asperities on the medium 152 and a head-medium physical contact event. That is, the variable resistance sensor 122 can monitor an electrical resistance that can be compared to other parameters, such as the heater power of the actuating suspension 110, to calculate the distance from the head 116 to the medium 152.

It is contemplated that the variable resistance sensor 122 is a differential ended thermal coefficient of resistance (DETCR) or other detection means that can monitor one or more operational parameters to sense real-time variations in the head-medium interface. Various embodiments utilize the readings of the variable resistance sensor 122 to evaluate both the head-medium interface 166 and the ambient temperature proximal the data storage media 154. It is noted that the ambient temperature is different from the temperature of the head-medium interface at the air bearing 162. In other words, the ambient temperature is characterized away from the air bearing 162. However, the ambient temperature may be located where air may be moving, but is not part of the air bearing 162.

With the variable resistance sensor 122 moving relative to the data storage medium 152 via the actuating suspension 110, the sensor 122 can measure ambient temperature at multiple different locations in the housing cavity 132. The ability to utilize sensed resistance to detect the size of the head-medium interface 166 as well as ambient temperature at various locations allows the data storage device 150 to control the actuating suspension 110 and data storage medium 152 to alter and correct detected conditions.

Figure 4A:
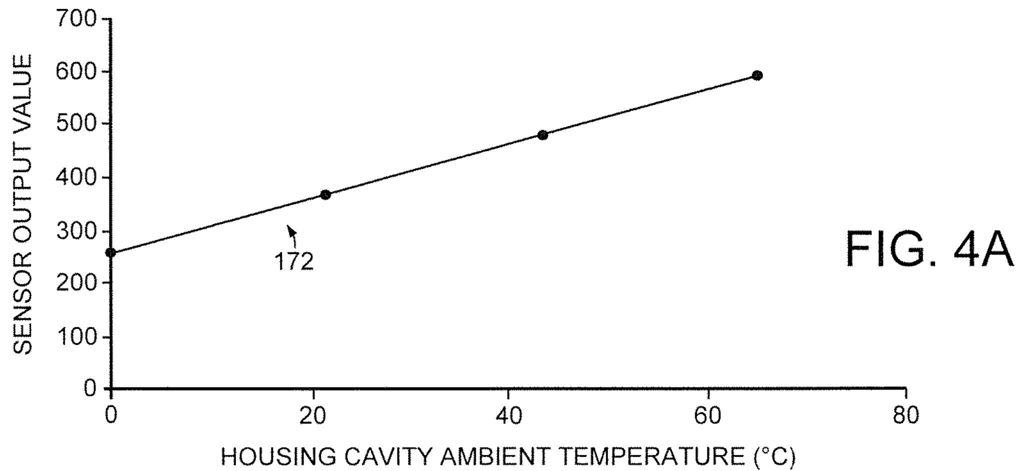
FIGS. 4A & 4B respectively plot operational data for an example data storage device operating in accordance with various embodiments.
Figure 4B:
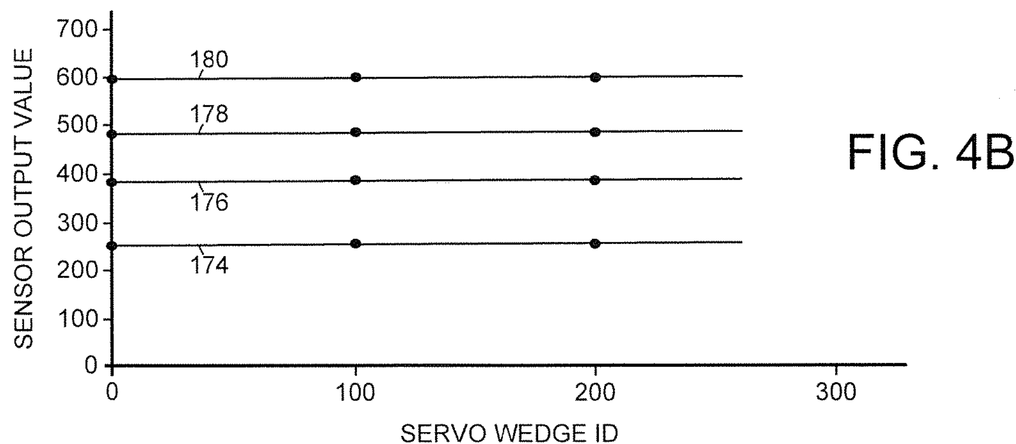

In comparison to using a thermal sensor, such as a thermistor, that is stationary within the housing 104, such as segmented location 168 to measure ambient temperature, the variable resistance sensor 122 can provide increased accuracy and tolerance due to the sensitivity of the variable resistance sensor 122. FIGS. 4A and 4B respectively plot data for example data storage device employing a variable resistance sensor on each transducing head positioned adjacent to the assorted data surfaces of the various data storage media in a single housing.

In FIG. 4A the output value from a variable resistance sensor is shown relative to the internal cavity ambient temperature in the data storage device where the variable resistance sensor is located. Line 172 conveys how the cavity ambient temperature has a substantially linear relationship to the sensor output. With the variable resistance sensor output value following a linear progression of line 172 and the high resolution of the sensor, the accuracy tolerance of an ambient temperature measurement can be +/−0.2° C.

FIG. 4B shows how the variable resistance sensor output is consistent and substantially linear for consecutive servo wedges. Specifically, line 174 represents at an ambient cavity temperature of 0° C., line 176 represents an ambient cavity temperature of 25° C., line 178 corresponds with an ambient cavity temperature of 45° C., and line 180 corresponds with an ambient cavity temperature of 65° C. As a result of the linearity of lines 172, 174, 176, 178, and 180, the output value of a variable resistance sensor can reliably measure the ambient temperature within a housing cavity despite moving with the actuating suspension.

It is noted that a variable resistance sensor can be utilized, in some embodiments, to measure ambient temperature while the transducing head is inert and not conducting data access operations. Activation of the transducing head allows the variable resistance sensor to detect the size of the head-medium interface by sensing the temperature during data access operations. For heat assisted magnetic recording (HAMR) transducing heads during active data access operations, the measurement of temperature by the variable resistance sensor will be affected by the near-field transducer (NFT) laser resident on transducing head.

Figure 5:
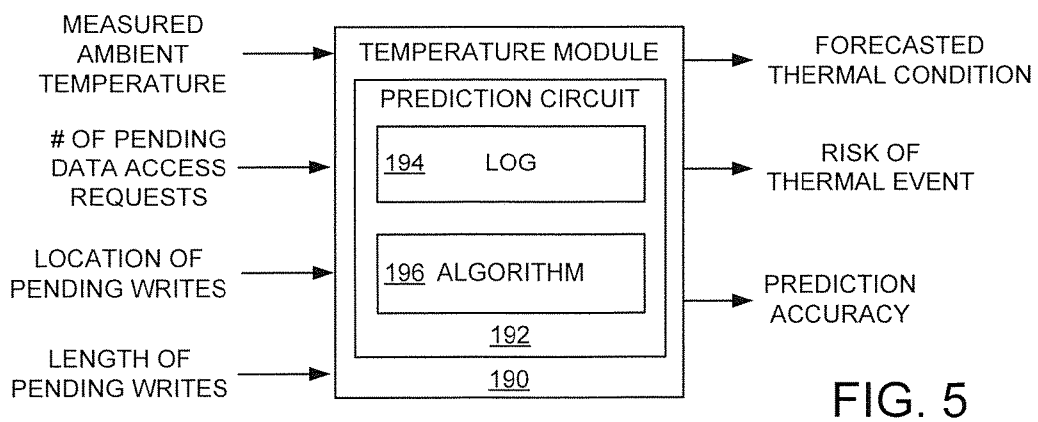
FIG. 5 displays a block representation of an example temperature module that can be employed in the data storage system of FIG. 1.

The consistent behavior of variable resistance output and the corresponding measurement of the ambient temperature of a housing cavity allow a local controller of a data storage device to predict future temperature conditions based on the logged and current ambient temperature readings from the variable resistance sensor. FIG. 5 depicts an example temperature module 190 that has a prediction circuit 192 that can forecast thermal conditions within a data storage device in accordance with some embodiments. The prediction circuit 192 can direct the storage of measured thermal conditions and any other device operational parameter, such as bit error rate, spindle motor power, and head fly height, in local memory as a thermal profile with the aid of the local controller 106.

It is noted that logged thermal profile may be continuously or sporadically monitored with less than all monitored conditions being temporarily, or permanently, stored in local memory as a log 194. The log 194 may additionally, or alternatively, contain data from other data storage devices, such as modeled devices or devices tested under specific stresses. A stored thermal profile in the behavior log 194 is not limited to an ambient temperature and can additionally consist of multiple different metrics, such as device performance and the number of pending data access requests over time.

The prediction circuit 192 may be configured to analyze any number and type of inputs, but in some embodiments, concurrently evaluates the real-time measured ambient cavity temperature and the pending data access requests to forecast future thermal conditions in the data storage device as well as the risk of predetermined thermal events. In the non-limiting embodiment of FIG. 5, the pending data access requests are evaluated for the overall number of requests, number of write requests, location of data access writes, and length of data to be written in a data access write.

The real-time information about the ambient temperature of the device and the data access activity that is pending allows the log 194 and at least one algorithm 196 to compute the likelihood that a thermal condition will happen in the future. It is contemplated that the prediction circuit 192 can simultaneously forecast multiple different thermal conditions over a particular time, such as in the next second, minute, or hour. The forecasted thermal conditions may be filtered by the prediction circuit 192 for accuracy by being compared to a confidence threshold, such as 95% or 99% confidence that the thermal condition will occur.

The prediction circuit 192, in some embodiments, evolves an algorithm 196 in response to a prediction self-test to improve the confidence and accuracy of forecasted thermal conditions. A prediction self-test can involve the prediction circuit 192 comparing forecasted thermal conditions, such as future ambient temperature, bit error rate, and head-medium contact, to the corresponding actual thermal conditions that occur. As a result of the prediction self-test, the prediction circuit 192 can generate accuracy confidence values along with risk percentages that forecasted will occur. That is, a risk percentage is a valuation of the chance that the combination of ambient temperature and data storage device operation will occur together while the accuracy confidence indicates how likely a forecasted thermal condition will occur within a predefined time window, such as the next minute.

If the prediction self-test finds consistently low accuracy confidence and/or risk percentages, the prediction circuit 192 can execute one or more testing patterns or model recent thermal conditions to re-calibrate the prediction algorithm. The ability to continually test and evolve the prediction circuit 192 provides optimal forecasting of thermal conditions and data storage device operational events regardless of changing operating conditions and data access volume.

Figure 6:
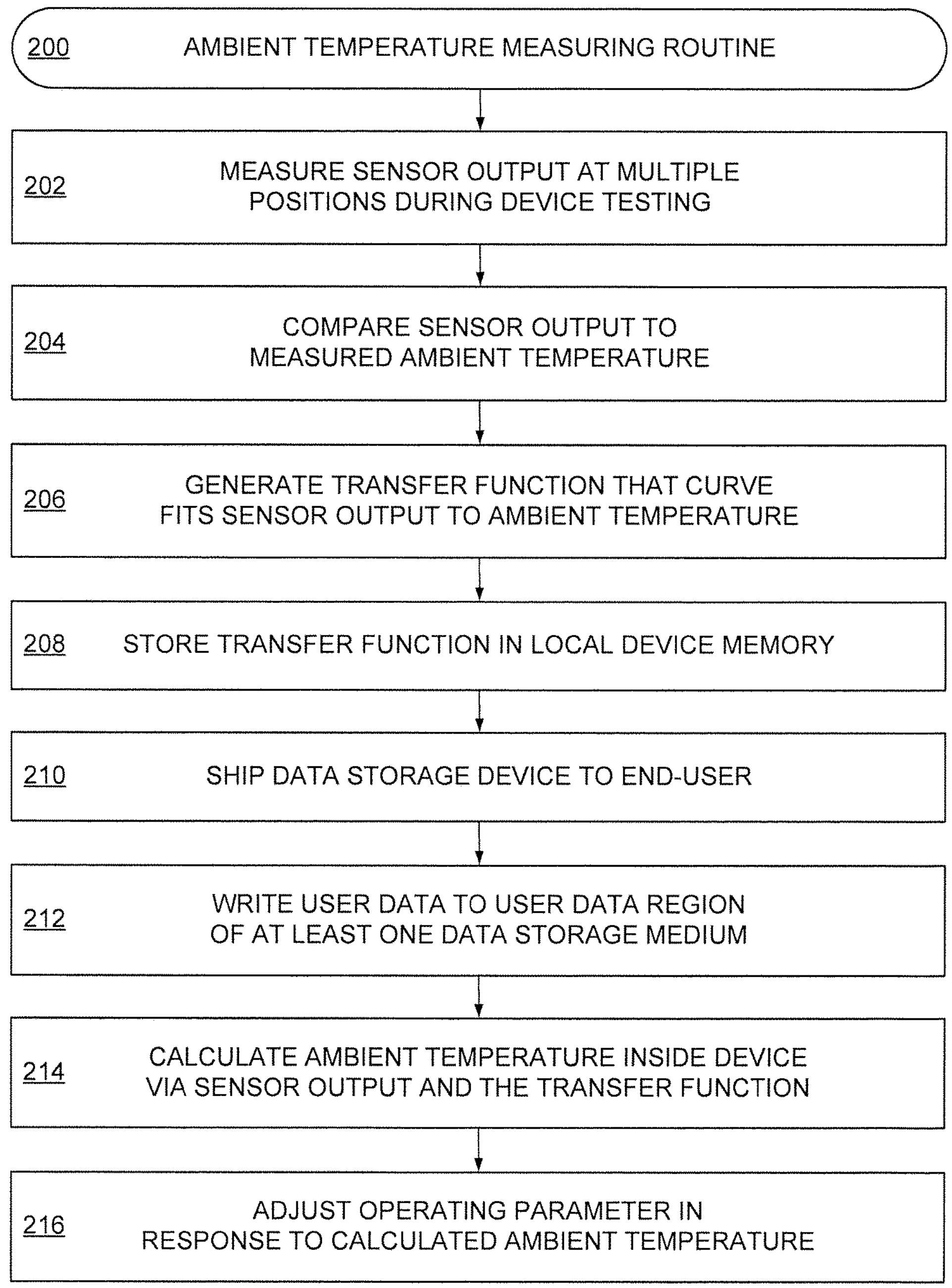
FIG. 6 provides an example ambient temperature measuring routine conducted in accordance with some embodiments.

FIG. 6 is an example ambient temperature measuring routine 200 that can be carried out with the assorted embodiments of FIGS. 1-5. The routine 200 begins during device manufacturing, which can be characterized as device certification testing, with step 202 prior to the device being presented to an end-user, such as customer. Step 202 measures the output of at least one variable resistance sensor at multiple positions and for multiple different ambient temperatures within the device housing. In some embodiments, step 202 gathers output from multiple sensors respectively positioned on different transducing heads that access different data surfaces of data storage media mounted on a common spindle.

The sensor output values corresponding to varying locations and ambient temperatures are then compared to an ambient temperature measurement taken by a certified testing instrument. It is contemplated that multiple separate temperature testing instruments are used at different locations within the device cavity to ensure the accuracy of the correlation between the variable resistance sensor and the actual ambient temperature. The comparison of sensor output to ambient temperature is subsequently curve fit to generate a transfer function that links multiple different sensor output to corresponding ambient temperatures within the data storage device.

The transfer function is then stored locally in memory of the data storage device in step 208 along with any curve-fit parameters needed to accurately calculate an ambient temperature based on sensor output values. The local memory may store multiple different transfer functions that correspond to the assorted variable resistance sensors positioned proximal different data storage media.

With testing and calibration of the temperature module and the respective variable resistance sensors, step 210 proceeds to ship the data storage device to an end-user where the device is expected to be installed in a computing system and utilized by the end-user to store user generated data in the user data region of the device in step 212. At any time before, during, or after step 212, step 214 can utilize the output value of at least one variable resistance sensor in the data storage device to calculate an ambient temperature.

Step 214 may concurrently, or sequentially, compute the readings from multiple different sensors in the data storage device to provide an average, mean, or adjusted ambient temperature within the device cavity. It is contemplated that step 214 calculates and retains multiple different sensor readings and the corresponding ambient temperatures to provide a thermal profile of the device cavity that conveys temperature variations at various locations within the cavity. The calculated ambient temperature(s) from step 214 can then be considered by the local device controller for warnings, alerts, and trends that trigger step 216 to alter one or more device operating parameters to prevent, mitigate, or reduce the effect of high, or volatile, temperatures on device performance, which can be measured in a variety of ways, such as data access latency, bit error rate, motor amperage draw, and data throughput.

Figure 7:
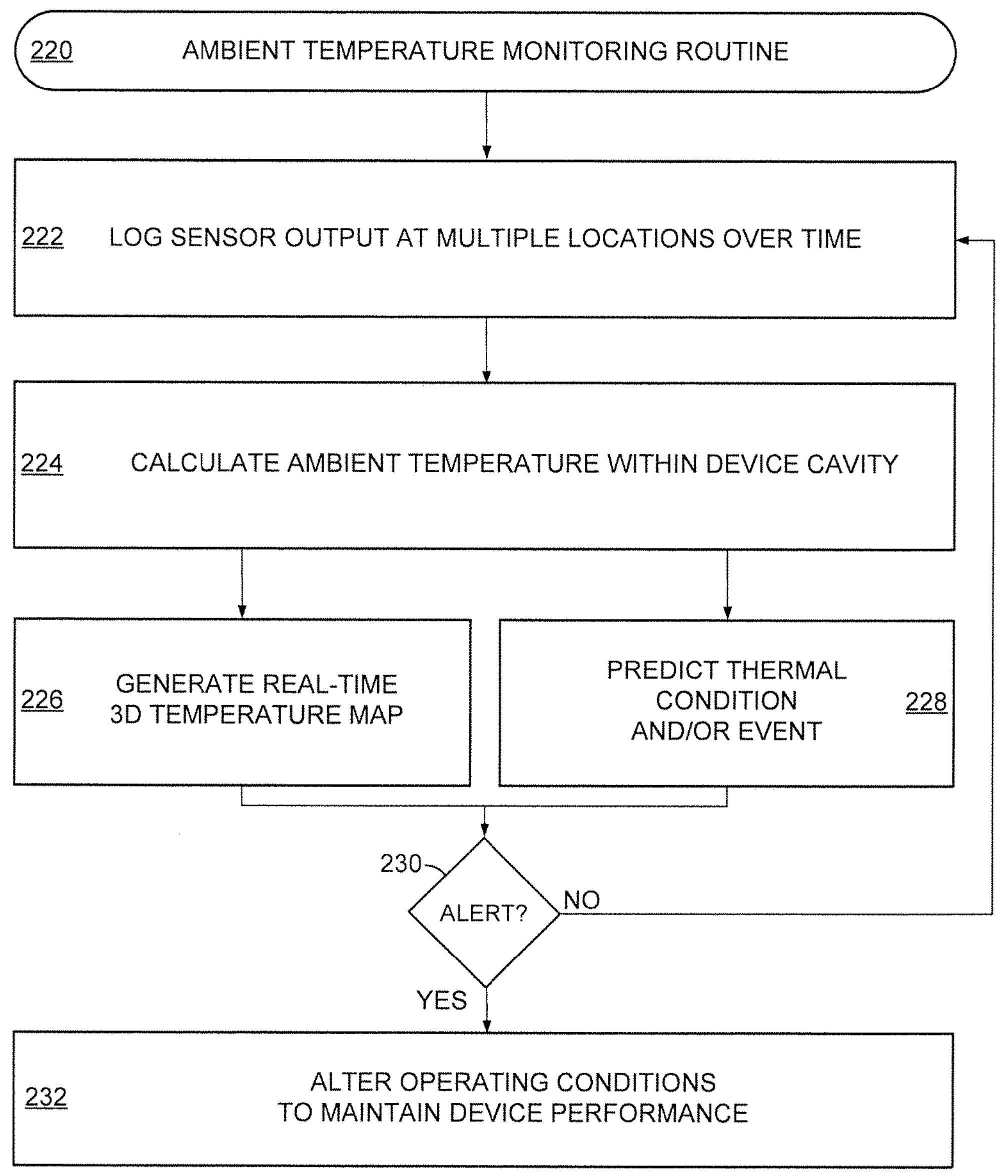
FIG. 7 illustrates an example ambient temperature monitoring routine carried out in accordance with various embodiments with the data storage system of FIG. 1.

FIG. 7 provides an example ambient temperature monitoring routine 220 that is executed by the data storage system of FIG. 1 in accordance with some embodiments. Initially, step 222 logs the output from one or more variable resistance sensor from multiple different locations within a data storage device housing cavity. The output from the respective sensor (s) is then calculated in step 224 as one or more ambient temperatures within the device cavity.

It is noted that steps 222 and 224 may be executed numerous times cyclically by routine 220 without advancing to further steps. That is, a data storage device can continuously or sporadically calculate ambient temperatures from logged sensor outputs before, during, and after any data access activity in the device. Hence, the data storage media of the device may, or may not, be spinning and one or more transducing heads of the device may, or may not, be active.

With one or more ambient temperatures calculated from step 224, steps 226 and 228 can utilize the ambient temperatures to characterize the current and future thermal profile of the data storage device. Step 226 generates a real-time three dimensional (3D) temperature map of at least a portion of the cavity within the device. Step 228 engages the prediction circuit of the temperature module to forecast a thermal condition and/or event. Steps 226 and 228 may be conducted concurrently, sequentially, or individually by the local device controller.

The 3D temperature map generated in step 226 can identify the calculated ambient temperatures and/or temperature gradients along vertical (Z-Y and Z-X) and horizontal (X-Y) planes. It is contemplated, but not required, that the 3D temperature map extends only to the extent of the data storage media within the device cavity, which would exclude the temperature around the circuit board and voice coil motor portions of the device where temperature does not degrade device performance as easily as proximal the data storage media. As discussed with regard to FIG. 5, step 228 can employ a prediction circuit to forecast future ambient temperatures, device operating temperatures, device performance, and critical thermal events, such as head-medium contact.

Decision 230 determines if the real-time temperatures from the 3D temperature map or a forecasted thermal situation trigger any predetermined alert thresholds. In other words, the local controller and/or temperature module can be programmed with one or more threshold values, such as temperature, gradient, bit error rate, head runout, and head fly-height, that trigger step 232 to alter one or more device operating conditions to at least maintain device performance over time. In the event that the current (real-time) and predicted thermal profile does not correspond to an alert, decision 230 returns routine 220 to step 222 where ambient temperature is measured via at least one variable resistance sensor.

As a non-limiting example of routine 220, different sensor readings from different transducing heads respectively positioned proximal to different data storage media can indicate the presence of different ambient temperatures along a vertical plane within the device, which can be visualized in real-time in the 3D map of step 226 and allow for a more accurate prediction of thermal events and device performance than if ambient temperature was measured by a static thermistor-type sensor. It is contemplated that multiple sensors respectively positioned on different transducing heads can provide redundant sensor outputs that can be collectively processed by the temperature module and local controller to optimize ambient temperature calculations in step 224.

Through the various embodiments of the present disclosure, a static ambient temperature sensor is eliminated from a data storage device, which reduces device cost and complexity to provide multi-location and three dimensional ambient temperature sensing without spacing and cost constraints. Use of a variable resistance sensor, such as a DETCR, can monitor temperature of a head-medium interface to prevent overheating breakdowns under situations associated with heavy load write, write-triggered laser heating in HAMR devices, and thermal shock recovery. A variable resistance sensor may further be used to estimate laser power changes in HAMR devices as well as estimate reader temperature variation based on the rise time of the head-medium interface temperature.

With the variable resistance sensor moving along with the transducing head, ambient temperature can be measured from assorted locations around a data storage medium. Also, individual head temperature measurement can be conducted to provide individual head-medium clearance measurement and compensation. The ability to generate a 3D temperature map with the measured temperatures from different locations allows a local controller to accurately model air flow within the device. By employing a variable resistance sensor as a second temperature sensor, any thermistor measurements made from within a device can be verified.

Employing a variable resistance sensor on a moving transducing head allows for air bearing size to be detected concurrently with device ambient temperature. Various embodiments are directed to measuring ambient temperature when a transducing head is inert, which can be characterized as not executing a data read or write. Calibration of a variable resistance sensor during device manufacturing, where testing instrumentation is more precise, prevents re-calibration from being necessary once a device is shipped to an end-user. However, the accuracy of the variable resistance sensor can be updated by employing the spindle motor operating current.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:

separating a transducing head from a data storage medium with an air bearing within a housing, the transducing head comprising a variable resistance sensor, a temperature module positioned within the housing and connected to the variable resistance sensor, measuring a plurality of operational variables with the variable resistance sensor;

calculating a plurality of ambient temperatures within the housing based on the plurality of measured operational variables; and creating a three dimensional ambient temperature map within the housing in response to the plurality of calculated ambient temperatures.

2. The method of claim 1, wherein the variable resistance sensor detects contact of the transducing head with the data storage medium during the measuring of the plurality of operational variables.

3. The method of claim 1, wherein the plurality of ambient temperatures is calculated via a transfer function specific to the transducing head.

4. The method of claim 3, wherein the transfer function is generated by a local controller during testing of the transducing head.

5. The method of claim 4, wherein the testing is conducted prior to any end-user data being stored on the data storage medium.

6. The method of claim 3, wherein the transfer function is altered by a local controller positioned in the housing in response to an operational event.

7. The method of claim 1, wherein the variable resistance sensor detects change in heater power for the transducing head and compares the change in heater power to a detected electrical resistance to provide the at least one operational variable of the plurality of operational variables.

8. The method of claim 1, wherein the plurality of calculated ambient temperatures have a tolerance of 0.2° C.

9. The method of claim 1, wherein each of the plurality of ambient temperatures are not part of an air bearing between the transducing head and the data storage medium.

10. The method of claim 1, wherein variable resistance sensor moves within the housing as part of an actuating suspension.

11. An apparatus comprising a transducing head separated from a data storage medium by an air bearing within a housing, the transducing head comprising a variable resistance sensor, a temperature module positioned within the housing and connected to the variable resistance sensor, the temperature module configured to calculate a plurality of ambient temperatures of the housing and create an ambient temperature map of within the housing in response to the plurality of calculated ambient temperatures and in response to an output of the variable resistance sensor.

12. The apparatus of claim 11, wherein the variable resistance sensor is a differential-ended thermal coefficient of resistance (DETCR).

13. The apparatus of claim 11, wherein the variable resistance sensor is positioned on the transducing head.

14. The apparatus of claim 11, wherein the transducing head is positioned relative to the data storage medium by an actuating suspension.

15. The apparatus of claim 11, wherein the housing does not contain a thermal sensor.

16. A method comprising:

separating a transducing head from a data storage medium with an air bearing within a housing, the transducing head comprising a variable resistance sensor, a temperature module positioned within the housing and connected to the variable resistance sensor, measuring first and second resistances with the variable resistance sensor respectively from at least two different positions on the data storage medium;

calculating first and second ambient temperatures within the housing based on the measured resistances; and creating an ambient temperature map within the housing in response to the calculated ambient temperatures.

17. The method of claim 16, wherein the temperature map is generated by a local controller positioned within the housing.

18. The method of claim 17, wherein a prediction module connected to the local controller predicts degraded transducing head performance and the local controller proactively alters at least one pending data access request to maintain transducing head performance.

19. The method of claim 16, wherein the temperature map is three dimensional.

20. The method of claim 16, wherein at least one scheduled operation of the transducing head is modified in response to the temperature map.

* * * * *